(12) United States Patent
Suda et al.

(10) Patent No.: US 11,041,433 B2
(45) Date of Patent: Jun. 22, 2021

(54) EXHAUST CASING FOR TURBOCHARGER, AND METHOD FOR MANUFACTURING SAME

(71) Applicants: GUNMA PREFECTURE, Maebashi (JP); NAIGAI CO., LTD., Takasaki (JP)

(72) Inventors: Takashi Suda, Maebashi (JP); Tomoaki Sakata, Maebashi (JP); Jun Ozawa, Takasaki (JP); Naoyuki Utsumi, Takasaki (JP)

(73) Assignees: Gunma Prefecture, Gunma (JP); Naigal Co., Ltd., Gunma (JP)

( * ) Notice: Subject to any disclaimer, the term of this patent is extended or adjusted under 35 U.S.C. 154(b) by 0 days.

(21) Appl. No.: 16/960,758

(22) PCT Filed: Jan. 10, 2019

(86) PCT No.: PCT/JP2019/000467
§ 371 (c)(1),
(2) Date: Jul. 8, 2020

(87) PCT Pub. No.: WO2019/139068
PCT Pub. Date: Jul. 18, 2019

(65) Prior Publication Data
US 2020/0347779 A1    Nov. 5, 2020

(30) Foreign Application Priority Data
Jan. 11, 2018    (JP) .............................. JP2018-002621

(51) Int. Cl.
*F02B 39/00* (2006.01)
*F02C 6/12* (2006.01)

(52) U.S. Cl.
CPC .............. *F02B 39/005* (2013.01); *F02C 6/12* (2013.01); *F05D 2220/40* (2013.01); *F05D 2240/14* (2013.01)

(58) Field of Classification Search
CPC .......... F02B 39/005; F02B 39/00; F02C 6/12; F05D 2220/40; F05D 2240/14
See application file for complete search history.

(56) References Cited

U.S. PATENT DOCUMENTS

| 10,364,761 B2 | 7/2019 | Sivaraman et al. |
| 2003/0164333 A1 | 9/2003 | Nohren, Jr. et al. |

FOREIGN PATENT DOCUMENTS

| JP | S57-030332 | 2/1982 |
| JP | S62-010239 U | 1/1987 |

(Continued)

OTHER PUBLICATIONS

Office Action dated Apr. 2, 2021 issued in the corresponding Indian Patent Application No. 202017034190.

*Primary Examiner* — Audrey K Bradley
*Assistant Examiner* — Edward Bushard
(74) *Attorney, Agent, or Firm* — Carrier Blackman & Associates, P.C.; Joseph P. Carrier; Anne G. Sabourin (57) ABSTRACT

There is provided an exhaust casing for a turbocharger that can be reduced in weight and can be easily machined. The exhaust casing (1) for the turbocharger includes an exhaust casing body (2) for the turbocharger that has a hollow structure and is made of a casting of iron-based metal, a light metal layer (3) that serves as an outer shell, and a heat insulating layer (4) that is provided between the exhaust casing body (2) and the light metal layer (3).

3 Claims, 6 Drawing Sheets

(56) References Cited

FOREIGN PATENT DOCUMENTS

| JP | H01-179133 U | | 12/1989 |
|---|---|---|---|
| JP | 2007-002791 A | | 1/2007 |
| JP | 2007002791 A | * | 1/2007 |
| JP | 2016-098672 A | | 5/2016 |
| JP | 2016-118136 A | | 6/2016 |
| JP | 2016-180310 A | | 10/2016 |

* cited by examiner

EXHAUST CASING FOR TURBOCHARGER, AND METHOD FOR MANUFACTURING SAME

TECHNICAL FIELD

The present invention relates to an exhaust casing for a turbocharger and a method for manufacturing the same.

BACKGROUND ART

Conventionally, there is known a turbocharger that rotates a turbine wheel attached to one end of a shaft member by using exhaust gas discharged from an engine and pressurizes air by using a compressor wheel attached coaxially with the turbine wheel at the other end of the shaft member to supply the air to a combustion chamber of the engine (e.g., see Patent Document 1).

The engine equipped with the turbocharger can obtain a large output with a small displacement. Therefore, in recent years, especially in an automotive engine, improving fuel efficiency is performed by mounting thereon a turbocharger to downsize the engine. Because an exhaust casing for the turbocharger requires heat resistance to exhaust gas and also requires high precision in dimensions, shape, etc. as a product to be mounted on the downsized engine, the exhaust casing is manufactured by casting of iron-based metal such as heat-resistant stainless steel, for example.

However, according to the exhaust casing for the turbocharger manufactured by the casting of iron-based metal, heat resistance to exhaust gas and high precision as a product can be achieved, but there is a problem that the weight increases and machining for mounting on an engine etc. is difficult. Therefore, in order to solve the problem, it is considered that the outer shell of the exhaust casing body for the turbocharger is formed of light metal such as aluminum alloy or magnesium alloy that can be easily machined. Moreover, it is considered that a means for forming the outer shell of the exhaust casing body for the turbocharger with the light metal is to cast the exhaust casing body with the light metal by using the exhaust casing body as a core, for example.

CITATION LIST

Patent Literature

Patent Literature 1: Japanese Patent Application Laid-Open No. 2016-118136

SUMMARY OF INVENTION

Technical Problem

However, because the melting point of the light metal is around 650-660° C. and contrariwise the temperature of the exhaust gas is 700-900° C., there is an inconvenience that the light metal might be melted by heat radiation from the exhaust gas when the light metal is used to form the outer shell of the exhaust casing body for the turbocharger.

Moreover, when casting the exhaust casing body as a core with the light metal, there is an inconvenience that poor casting such as a sink may occur in a casting of the light metal due to air and water vapor discharged from the exhaust casing manufactured by the casting of iron-based metal. Furthermore, when casting the exhaust casing body as a core with the light metal, there is an inconvenience that the molten light metal may be cooled by the exhaust casing body and solidify prematurely, resulting in poor running of the melt and poor casting.

An object of the present invention is to provide an exhaust casing for a turbocharger that can be reduced in weight and be easily machined by eliminating such inconveniences. Moreover, an object of the invention is to provide a manufacturing method capable of manufacturing the exhaust casing for the turbocharger without causing poor casting.

Solution to Problem

In order to achieve these objects, an exhaust casing for a turbocharger according to the present invention includes: an exhaust casing body for the turbocharger that has a hollow structure serving as an inner shell and is made of a casting of iron-based metal; a light metal layer that serves as an outer shell; and a heat insulating layer that is provided between the exhaust casing body and the light metal layer, the heat insulating layer suppressing heat radiation from exhaust gas flowing through the hollow structure.

According to the exhaust casing for the turbocharger of the present invention, because the exhaust casing body for the turbocharger that has a hollow structure serving as an inner shell is made of a casting of iron-based metal, it is possible to achieve heat resistance to exhaust gas flowing through the hollow structure and a product precision suitable for mounting on the downsized engine. Moreover, according to the exhaust casing for the turbocharger of the present invention, because the outer shell of the exhaust casing body is made of the light metal, it is possible to reduce the overall weight and further to facilitate machining at the time of mounting on the engine. Furthermore, according to the exhaust casing for the turbocharger of the present invention, because the heat insulating layer is provided between the exhaust casing body and the light metal layer, heat radiation from exhaust gas flowing through the hollow structure can be suppressed by the heat insulating layer and thus the light metal layer can be prevented from being melted by the heat radiation from the exhaust gas.

The exhaust casing for the turbocharger of the present invention can be manufactured by the first manufacturing method including, for example, a step of casting the exhaust casing body with iron-based metal; a step of coating at least a part of an outer surface of the exhaust casing body with silica-based heat insulation material or heat insulation material made of gypsum forming the heat insulating layer to form a heat insulation material layer; and a step of placing, by using as a core the exhaust casing body including the heat insulation material layer on at least the part of the outer surface, the core being arranged in a mold having an inner surface shape that matches an outer surface shape of the exhaust casing, and forming the light metal layer by pouring molten light metal into a cavity formed between the core and the mold to cast the exhaust casing body with the light metal.

According to the first manufacturing method, the exhaust casing body is first cast with iron-based metal. Then, the heat insulation material layer is formed by coating at least the part of the outer surface of the exhaust casing body obtained by the casting with silica-based heat insulation material or heat insulation material made of gypsum forming the heat insulating layer.

Then, the core is placed in the mold having the inner surface shape that matches the outer surface shape of the exhaust casing by using as the core the exhaust casing body including the heat insulation material layer on at least the part of the outer surface, and the light metal layer is formed by pouring molten light metal into the cavity formed between the core and the mold to cast the exhaust casing body with the light metal. When doing this, because unevenness is formed on the surface of the heat insulation material layer, air and water vapor discharged from the exhaust casing body can escape outside the cavity along the unevenness on the surface of the heat insulation material layer and further the molten light metal can be suppressed from being cooled by the exhaust casing body by using the heat insulation material layer to form the light metal layer without causing poor casting. As a result, according to the first manufacturing method, the heat insulating layer in the exhaust casing for the turbocharger obtained by the first manufacturing method can be formed of the heat insulation material layer used for forming the light metal layer.

Moreover, the exhaust casing for the turbocharger of the present invention can be manufactured by the second manufacturing method including, for example, a step of casting the exhaust casing body with iron-based metal; a step of coating at least a part of an outer surface of the exhaust casing body with casting sand to form a casting sand layer; a step of placing, by using as a core the exhaust casing body including the casting sand layer on at least the part of the outer surface, the core being arranged in a mold having an inner surface shape that matches an outer surface shape of the exhaust casing, and forming the light metal layer by pouring molten light metal into a cavity formed between the core and the mold to cast the exhaust casing body with the light metal; a step of forming a through-hole in a part of the light metal layer and taking out the casting sand from the through-hole; and a step forming an air layer as the heat insulating layer by closing the through-hole.

According to the second manufacturing method, the exhaust casing body is first cast with iron-based metal. Then, the casting sand layer is formed by coating at least the part of the outer surface of the exhaust casing body obtained by the casting with the casting sand.

Then, the core is placed in the mold having the inner surface shape that matches the outer surface shape of the exhaust casing by using as the core the exhaust casing body including the casting sand layer on at least the part of the outer surface, and the light metal layer is formed by pouring molten light metal into the cavity formed between the core and the mold to cast the exhaust casing body with the light metal. When doing this, because the surface of the casting sand layer becomes rough, air and water vapor discharged from the exhaust casing body can escape outside the cavity along the rough surface on the surface of the casting sand layer. Further, because the casting sand layer acts as heat insulation material, the molten light metal can be suppressed from being cooled by the exhaust casing body and thus the light metal layer can be formed without causing poor casting.

Next, in the second manufacturing method, the through-hole is formed in the part of the light metal layer, and by closing the through-hole after taking out the casting sand from the through-hole, the air layer serving as the heat insulating layer in the exhaust casing for the turbocharger obtained by the second manufacturing method can be formed in the space of the casting sand layer.

As a result, according to the second manufacturing method, the heat insulating layer in the exhaust casing for the turbocharger obtained by the second manufacturing method can be formed by using the casting sand layer used for forming the light metal layer.

Moreover, in the second manufacturing method, granular ceramic may be filled in the space of the casting sand layer from the through-hole after taking out the casting sand from the through-hole. The heat insulating layer made of the granular ceramic can be formed by closing the through-hole after filling the granular ceramic. Also when doing this, the heat insulating layer in the exhaust casing for the turbocharger obtained by the second manufacturing method can be formed by using the casting sand layer used for forming the light metal layer.

DESCRIPTION OF EMBODIMENTS

Next, an embodiment of the present invention will be explained further in detail with reference to the accompanying drawings.

Figure 1A:
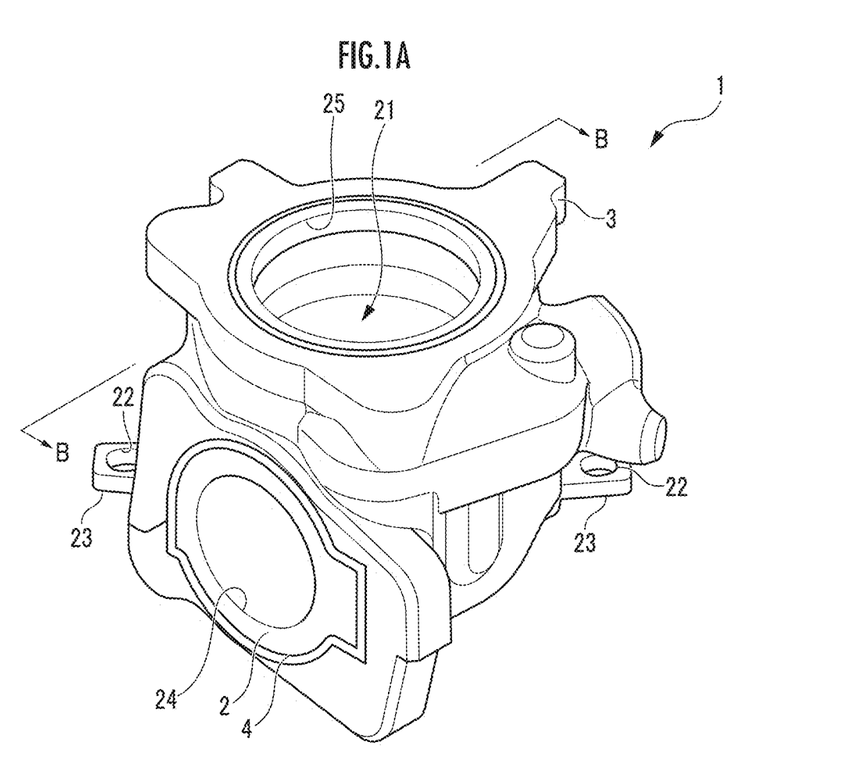
FIG. 1A is a perspective view illustrating a configuration of an exhaust casing for a turbocharger according to the present invention.
Figure 1B:
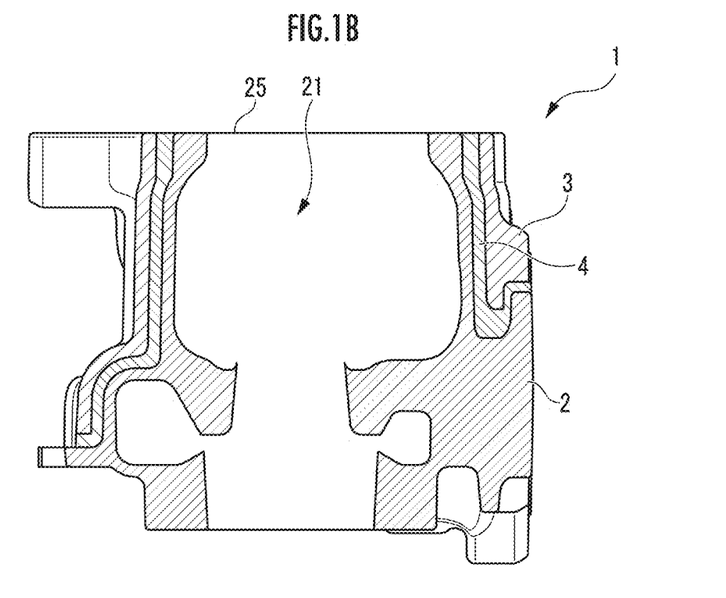
FIG. 1B is a B-B line cross-sectional view of FIG. 1A.

As illustrated in FIG. 1, an exhaust casing 1 for a turbocharger according to the present embodiment includes an exhaust casing body 2 for the turbocharger that has a hollow structure serving as an inner shell, a light metal layer 3 that serves as an outer shell, and a heat insulating layer 4 that is provided between the exhaust casing body 2 and the light metal layer 3.

The exhaust casing body 2 is made of a casting of iron-based metal, and includes a hollow structure 21 through which exhaust gas flows inside and a tongue projection 23 that includes a through-hole 22 to regulate the position when setting in a mold of the light metal layer 3 when casting the light metal layer 3 on the outer surface. The hollow structure 21 includes an inlet 24 and an outlet 25 that open to the outer surface of the exhaust casing 1. For example, the iron-based metal can use heat-resistant stainless steel etc. such as SCH13.

The light metal layer 3 is made of aluminum alloy or magnesium alloy such as AC4A, for example, and is formed to surround the inlet 24 and the outlet 25.

The heat insulating layer 4 suppresses (heat insulation) heat radiation from exhaust gas flowing through the hollow structure 21 so that the light metal layer 3 is prevented from being melted by heat radiation from the exhaust gas. The heat insulating layer 4 may be made of silica-based heat insulation material (e.g., Siltex (trade name) made by Nichias Corporation or Isowool (trade name) made by Isolite Insulating Products Co., Ltd.) or heat insulation material made of gypsum, or may be made of an air layer.

Next, the manufacturing method of the exhaust casing 1 illustrated in FIG. 1 will be explained with reference to FIGS. 2 to 5.

Figure 2A:
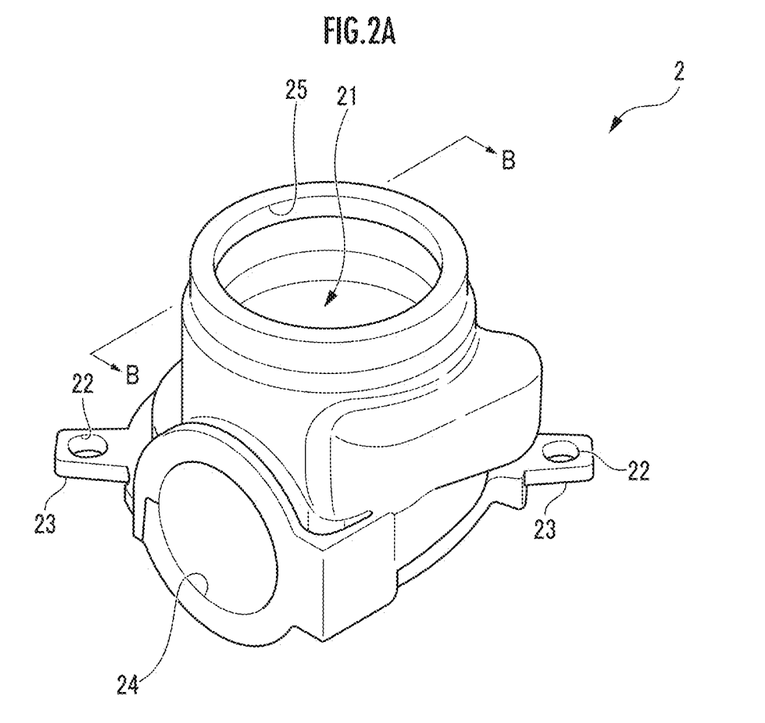
FIG. 2A is a perspective view illustrating a configuration of an exhaust casing body for the turbocharger according to the present invention.
Figure 2B:
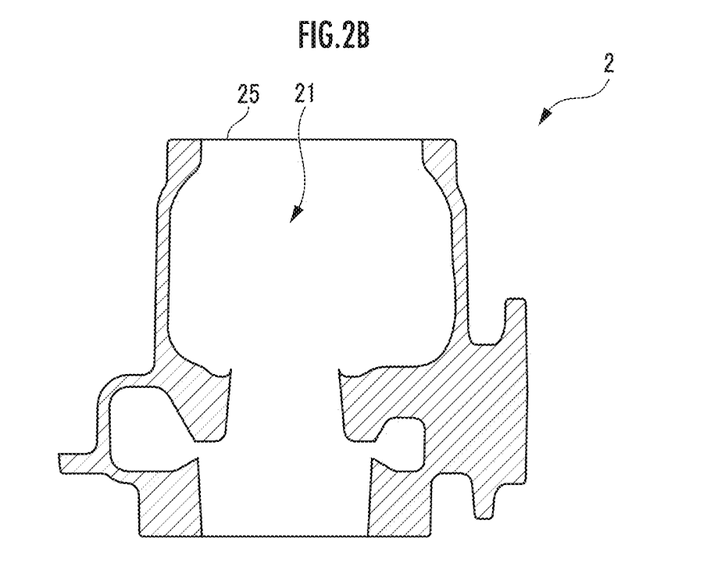
FIG. 2B is a B-B line cross-sectional view of FIG. 2A.

When manufacturing the exhaust casing 1, the casting of the exhaust casing body 2 illustrated in FIGS. 2A and 2B is first performed. As described above, the exhaust casing body 2 includes the hollow structure 21 through which the exhaust gas flows inside and the tongue projection 23 that includes the through-hole 22 to regulate the position when setting in the mold of the light metal layer 3 when casting the light metal layer 3 on the outer surface. The exhaust casing body 2 may further include a positioning protrusion (not illustrated) of the light metal layer 3. The hollow structure 21 includes the inlet 24 and the outlet 25 that open to the outer surface.

Figure 3:
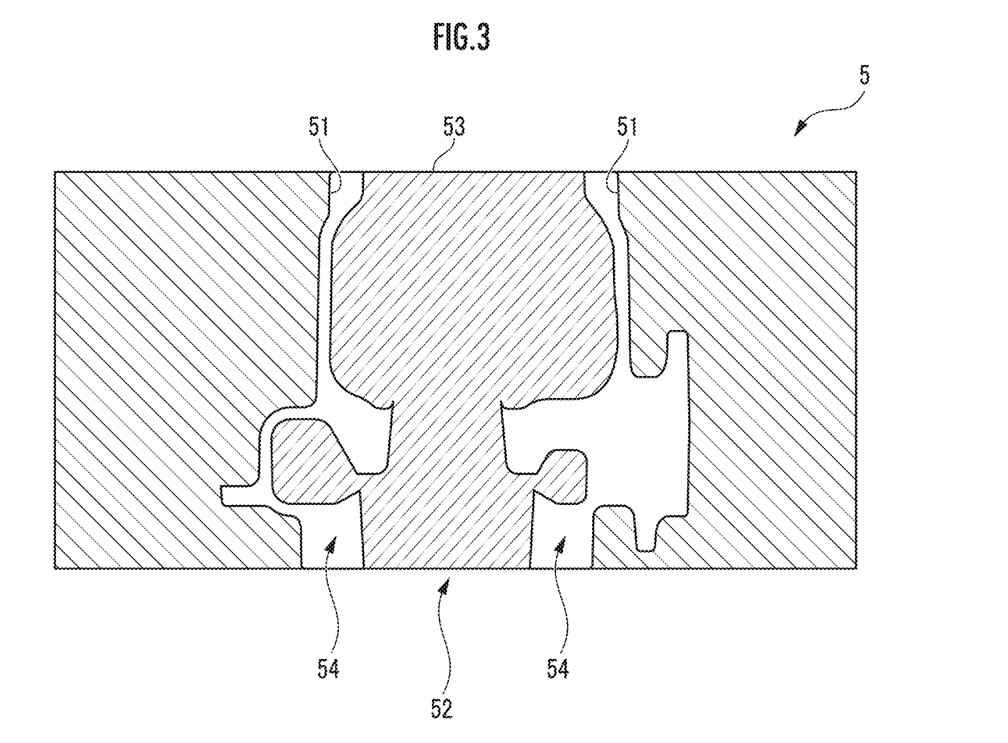
FIG. 3 is an explanatory cross-sectional view of a mold used for casting the exhaust casing body illustrated in FIG. 2.

Next, the exhaust casing body 2 is cast by using a first mold 5 illustrated in FIG. 3. The first mold 5 includes therein an inner surface 51 having a shape matching the outer surface shape of the exhaust casing body 2 and a hollow portion 52 formed by the inner surface 51. By placing in the hollow portion 52 a core 53 made of a sand mold having the outer surface shape that matches the inner surface shape of the hollow structure 21 of the exhaust casing body 2, a cavity 54 is formed between the inner surface 51 of the first mold 5 and the outer surface of the core 53.

The first mold 5 can be divided into a plurality of split molds by a parting line not illustrated and is formed by a sand mold. Moreover, the first mold 5 includes a sprue runner (not illustrated) communicating with the cavity 54 and a sprue (not illustrated) communicating with the sprue runner. The first mold 5 may further include a hot top not illustrated. Moreover, a sand mold that forms the first mold 5 or the core 53 can be formed by a method known per se by using casting sand.

Next, in the manufacturing method of the present embodiment, molten iron-based metal such as heat-resistant stainless steel such as SCH13 is injected from the sprue into the cavity 54, and after the molten iron-based metal is cooled and solidified, the mold is removed to obtain the exhaust casing body 2 illustrated in FIG. 2.

Figure 4A:
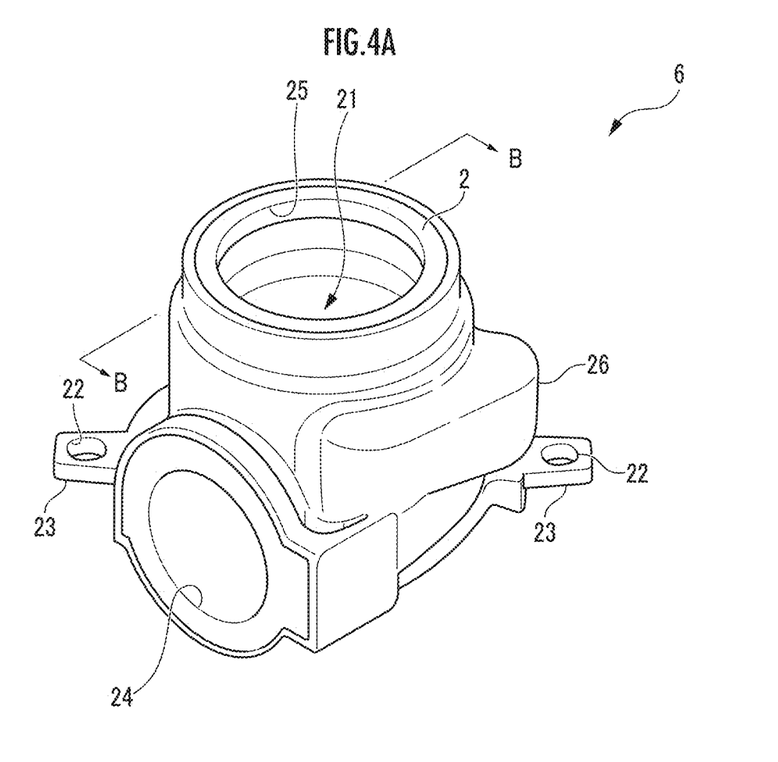
FIG. 4A is a perspective view illustrating a state where a heat insulation material layer is formed on the outer surface of the exhaust casing body illustrated in FIG. 2.
Figure 4B:
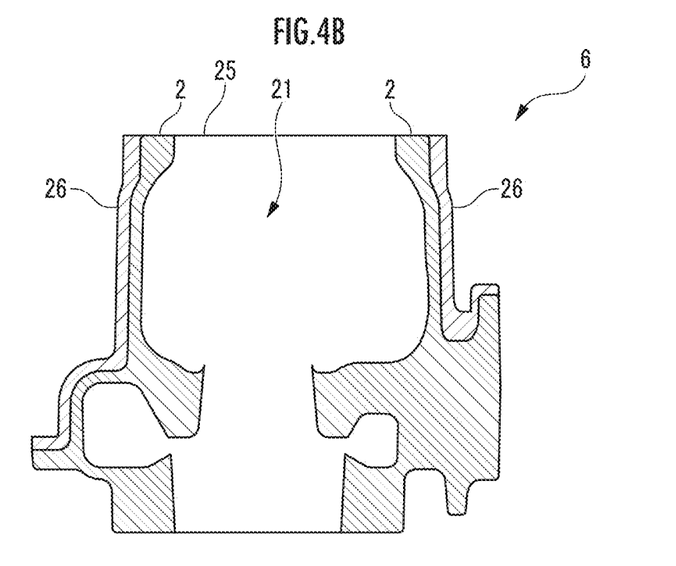
FIG. 4B is a B-B line cross-sectional view of FIG. 4A.

Next, in the manufacturing method of the present embodiment, as illustrated in FIGS. 4A and 4B, a heat insulation material layer 26 is formed by coating at least a part of the outer surface of the exhaust casing body 2 with silica-based heat insulation material or heat insulation material made of gypsum forming the heat insulating layer 4, and a coated exhaust casing body 6 of which at least a part of the outer surface is coated by the heat insulation material layer 26 is formed. In the coated exhaust casing body 6, the heat insulation material layer 26 only needs to coat at least the part of the outer surface of the exhaust casing body 2, specifically, a portion where the light metal layer 3 is formed, and thus the tongue projection 23 and a positioning protrusion (not illustrated) of the light metal layer 3 may be exposed from the heat insulation material layer 26.

The heat insulation material layer 26 is made of, for example, silica-based heat insulation material (e.g., Siltex (trade name) made by Nichias Corporation or Isowool (trade name) made by Isolite Insulating Products Co., Ltd.) or heat insulation material made of gypsum, and can be formed as follows, for example.

When using flexible sheet-like heat insulation material (e.g., Siltex (trade name) made by Nichias Corporation) as heat insulation material, a three-dimensional shape of a portion, where the heat insulation material layer 26 is to be formed, on the outer surface of the exhaust casing body 2 is developed into a plan view, and then a cutting die (big die) of the plan view is made and the heat insulation material is die-cut by the cutting die. Then, heat resistant inorganic adhesive (e.g., Chao stick (trade name) made by Isolite Insulating Products Co., Ltd.) is applied on the portion, where the heat insulation material layer 26 is to be formed, on the outer surface of the exhaust casing body 2 and the die-cut heat insulation material is attached thereto, and then the heat insulation material layer 26 is formed by heating and drying it.

When forming the three-dimensional heat insulation material layer 26, a metal mold to which a portion, where the heat insulation material layer 26 is to be formed, on the outer surface of the exhaust casing body 2 is transferred is made, and a three-dimensional shape according to the metal mold is developed into a plan view. Next, a bulk of a slurry state made by mixing cotton-like heat insulation material (e.g., Isowool (trade name) made by Isolite Insulating Products Co., Ltd.) with water is sucked and is attached to the metal mold, and then a molded product is obtained by heating, drying and curing it. Then, the portion, where the heat insulation material layer 26 is to be formed, on the outer surface of the cured exhaust casing body 2 is coated with the molded product to form the heat insulation material layer 26.

Moreover, when using gypsum, the exhaust casing body 2 is set in a mold for gypsum molding, gypsum (e.g., Non-foam Casting Gypsum High Stone C-2 Type NK (trade name) made by Yoshino Gypsum Sales Co., Ltd.) is poured into the mold, and the heat insulation material layer 26 is formed by naturally drying it.

Figure 5:
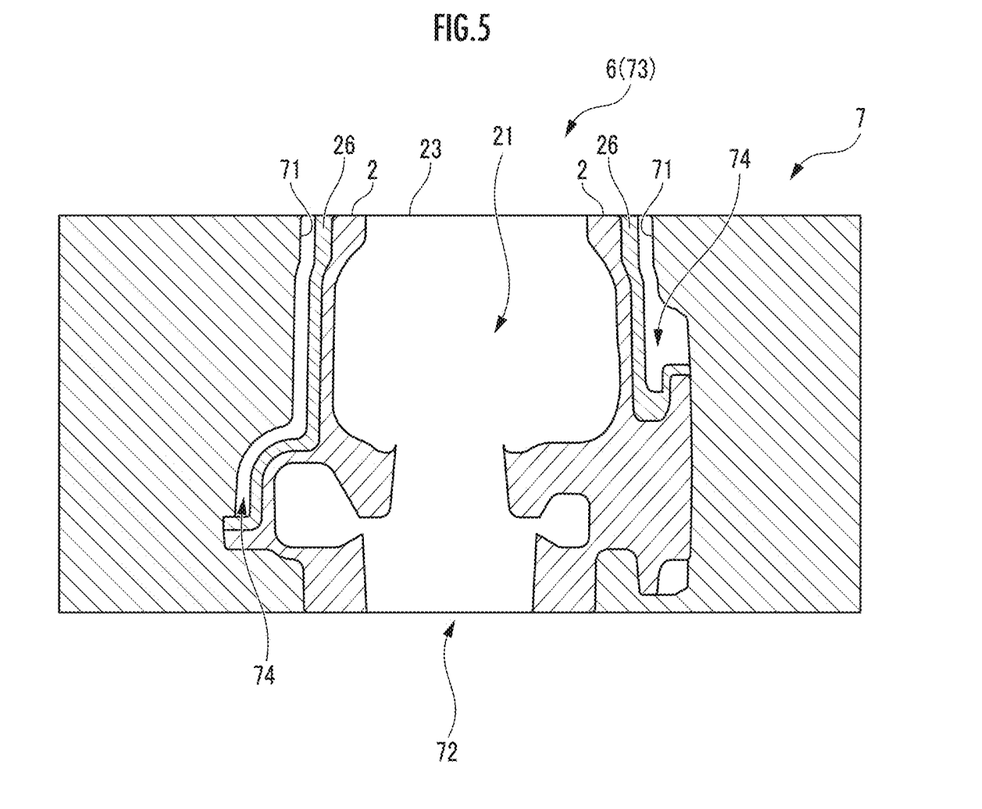
FIG. 5 is an explanatory cross-sectional view of a mold used for casting a light metal layer of the exhaust casing for the turbocharger illustrated in FIG. 1 according to the present invention.

Next, in the manufacturing method of the present embodiment, the light metal layer 3 is formed by casting the coated exhaust casing body 6 with light metal such as aluminum alloy or magnesium alloy such as AC4A by using a second mold 7 illustrated in FIG. 5.

The second mold 7 includes therein an inner surface 71 having a shape matching the outer surface shape of the light metal layer 3 and a hollow portion 72 formed by the inner surface 71. By placing the coated exhaust casing body 6 in the hollow portion 72 as a core 73, a cavity 74 is formed between the inner surface 71 of the second mold 7 and the outer surface of the core 73.

The second mold 7 can be divided into a plurality of split molds by a parting line not illustrated, and may be a sand mold or a metal mold. Moreover, the second mold 7 includes a sprue runner (not illustrated) communicating with the cavity 74 and a sprue (not illustrated) communicating with the sprue runner. The second mold 7 may further include a hot top not illustrated. Moreover, a sand mold that forms the second mold 7 can be formed by a method known per se by using casting sand.

Next, in the manufacturing method of the present embodiment, molten light metal such as aluminum alloy or magnesium alloy such as AC4A is injected from the sprue into the cavity 74 and is cooled and solidified, and the light metal layer 3 is formed by casting the coated exhaust casing body 6.

When the molten metal is injected into the cavity 74, gas such as air contained in the exhaust casing body 2 and water vapor by the vaporization of moisture contained in the heat insulation material layer 26 is generated due to the heat of the molten metal.

However, in the manufacturing method of the present embodiment, because the unevenness (rough surface) is formed by the heat insulation material on the surface of the heat insulation material layer 26, the gas can be let escape outside the cavity 74 along the unevenness on the surface of the heat insulation material layer 26. Moreover, when injecting the molten metal into the cavity 74, because the cooling of the molten metal due to the exhaust casing body 2 is suppressed by the heat insulation material layer 26, the light metal layer 3 can be formed without causing poor casting. As a result, according to the manufacturing method of the present embodiment, the exhaust casing 1 for the turbocharger in which the heat insulating layer 4 is made of the heat insulation material layer 26 can be obtained from the configuration illustrated in FIGS. 1A and 1B.

In the exhaust casing 1 obtained by the manufacturing method of the present embodiment, the exhaust gas from the engine is supplied to the inlet 24 of the hollow structure 21 and is discharged from the outlet 25. At this time, because the melting point of the light metal such as aluminum alloy or magnesium alloy forming the light metal layer 3 is around 650-660° C. and contrariwise the temperature of the exhaust gas is 700-900° C., it is concerned that the light metal layer 3 is melted by heat radiation from the exhaust gas flowing through the hollow structure 21.

However, in the exhaust casing 1 obtained by the manufacturing method of the present embodiment, the heat insulation material layer 26 used to suppress the cooling of the molten light metal acts as the heat insulating layer 4 against the heat radiation from the exhaust gas. As a result, in the exhaust casing 1 obtained by the manufacturing method of the present embodiment, the light metal layer 3 is not melted by the heat radiation from the exhaust gas.

In the manufacturing method of the present embodiment, at least a part of the outer surface of the exhaust casing body 2 is coated by the heat insulation material to form the heat insulation material layer 26, but a casting sand layer may be formed by using the casting sand instead of the heat insulation material. Because the casting sand layer has a rough surface made of the casting sand, gas such as water vapor generated from the exhaust casing body 2 can be let escape outside the cavity 74 along the rough surface on the surface of the casting sand layer, similar to the heat insulation material layer 26. Moreover, because the casting sand layer acts as heat insulation material when injecting the molten metal into the cavity 74, the cooling of the molten metal due to the exhaust casing body 2 can be suppressed and thus the light metal layer 3 can be formed without causing poor casting.

The casting sand layer can be formed to coat at least a part of the outer surface of the exhaust casing body 2, specifically, a portion in which the light metal layer 3 is formed, by using a shell machine, for example.

When forming the light metal layer 3 by using the casting sand layer, a screw hole of a tapered screw for pipe is formed in the light metal layer 3 as a through-hole after forming the light metal layer 3, and the casting sand is taken out from the screw hole to the outside while breaking the casting sand layer with a shake machine. Then, when the removal of the casting sand is terminated, the space of the casting sand layer can be used as an air layer by screwing the tapered screw for pipe into the screw hole to close the screw hole, and the exhaust casing 1 for the turbocharger in which the heat insulating layer 4 is made of the air layer can be obtained from the configuration illustrated in FIGS. 1A and 1B.

Moreover, after the removal of the casting sand is terminated and then granular heat insulation material (e.g., granular Microtherm (trade name) made by Promat Japan Corp.) is press-fitted into the space of the casting sand layer from the screw hole, the space of the casting sand layer can be used as a granular heat insulation material layer by screwing the tapered screw for pipe into the screw hole to close the screw hole, and the exhaust casing 1 for the turbocharger in which the heat insulating layer 4 is made of the granular heat insulation material layer can be obtained from the configuration illustrated in FIGS. 1A and 1B.

Figure 6:
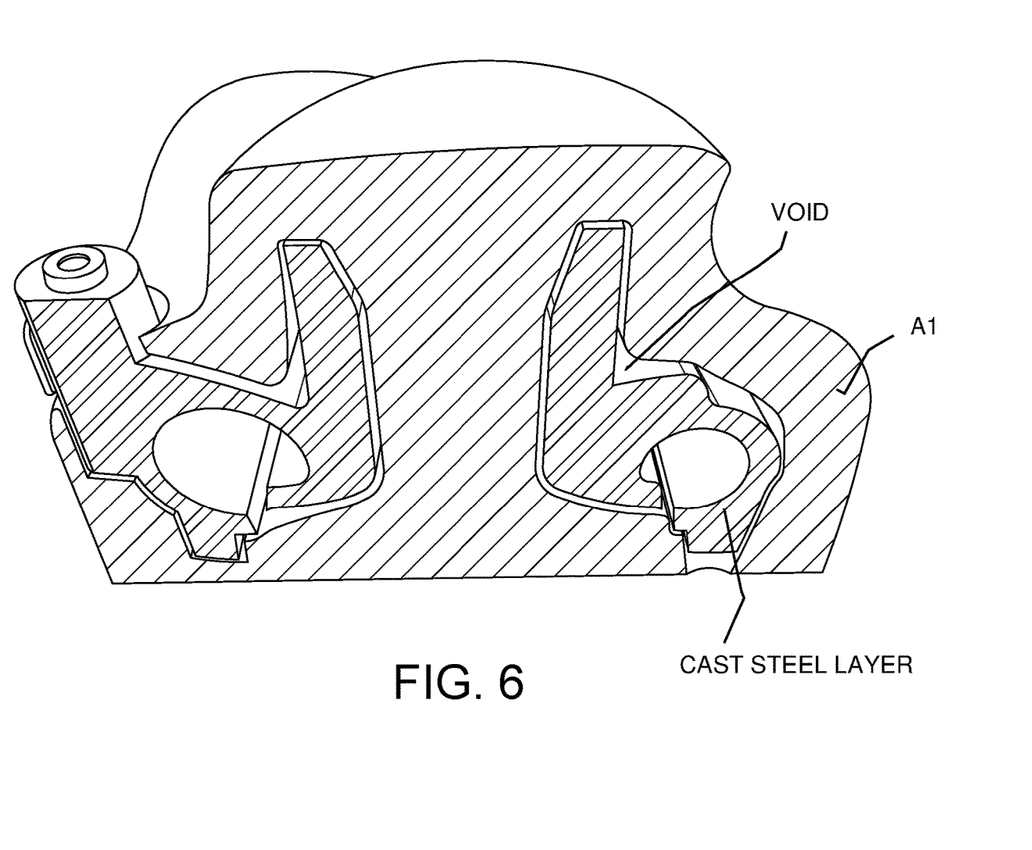
FIG. 6 is a photograph illustrating a cross section of an exhaust casing for which a light metal layer is cast without forming a heat insulation material layer on the outer surface of the exhaust casing body illustrated in FIG. 2.

Next, FIG. 6 illustrates a cross-section photograph of the exhaust casing 1 in which the light metal layer 3 is formed by casting with aluminum alloy without forming the heat insulation material layer 26 or the casting sand layer on the outer surface of the exhaust casing body 2 at all.

From FIG. 6, in the exhaust casing 1 in which the light metal layer 3 is formed by casting with aluminum alloy without forming the heat insulation material layer 26 or the casting sand layer on the outer surface of the exhaust casing body 2 at all, a void (sink) is recognized between a cast steel layer (the exhaust casing body 2) and Al (the light metal layer 3) and thus it is clear that poor casting is caused.

DESCRIPTION OF REFERENCE NUMERALS

1 Exhaust casing for turbocharger,
2 Exhaust casing body for turbocharger,
3 Light metal layer,
4 Heat insulating layer.

The invention claimed is:

1. A method of manufacturing an exhaust casing for a turbocharger,
the exhaust casing for the turbocharger including: an exhaust casing body for the turbocharger that has a hollow structure serving as an inner shell and is made of a casting of iron-based metal; a light metal layer that serves as an outer shell; and a heat insulating layer that is provided between the exhaust casing body and the light metal layer, the heat insulating layer suppressing heat radiation from exhaust gas flowing through the hollow structure,
the method comprising:
a step of casting the exhaust casing body with iron-based metal;
a step of coating at least a part of an outer surface of the exhaust casing body with silica-based heat insulation material or heat insulation material made of gypsum forming the heat insulating layer to form a heat insulation material layer; and
a step of placing, by using as a core the exhaust casing body including the heat insulation material layer on at least the part of the outer surface, the core being arranged in a mold having an inner surface shape that matches an outer surface shape of the exhaust casing, and forming the light metal layer by pouring molten light metal into a cavity formed between the core and the mold to cast the exhaust casing body with the light metal.

2. A method of manufacturing an exhaust casing for a turbocharger,
the exhaust casing for the turbocharger including: an exhaust casing body for the turbocharger that has a hollow structure serving as an inner shell and is made of a casting of iron-based metal; a light metal layer that serves as an outer shell; and a heat insulating layer that is provided between the exhaust casing body and the light metal layer, the heat insulating layer suppressing heat radiation from exhaust gas flowing through the hollow structure,
the method comprising:

a step of casting the exhaust casing body with iron-based metal;

a step of coating at least a part of an outer surface of the exhaust casing body with casting sand to form a casting sand layer;

a step of placing, by using as a core the exhaust casing body including the casting sand layer on at least the part of the outer surface, the core being arranged in a mold having an inner surface shape that matches an outer surface shape of the exhaust casing, and forming the light metal layer by pouring molten light metal into a cavity formed between the core and the mold to cast the exhaust casing body with the light metal;

a step of forming a through-hole in a part of the light metal layer and taking out the casting sand from the through-hole; and a step of forming, after taking out the casting sand, an air layer as the heat insulating layer in a space of the casting sand layer by closing the through-hole.

3. The method of manufacturing the exhaust casing for the turbocharger according to claim 2, the method further comprising:

a step of filling, after taking out the casting sand from the through-hole, granular ceramic in the space of the casting sand layer from the through-hole; and a step of forming, after filling the ceramic, the heat insulating layer made of the ceramic by closing the through-hole.

\* \* \* \* \*